United States Patent
Guo

(10) Patent No.: US 11,467,326 B2
(45) Date of Patent: Oct. 11, 2022

(54) COLOR FILTERING FILM, COLOR FILTER SUBSTRATE AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventor: Yuanhui Guo, Beijing (CN)

(73) Assignees: Hefei BOE Optoelectronics Technology Co., Ltd., Anhui (CN); Beijing BOE Technology Development Co., Ltd., Beijing (CN)

( * ) Notice: Subject to any disclaimer, the term of this patent is extended or adjusted under 35 U.S.C. 154(b) by 778 days.

(21) Appl. No.: 16/330,580

(22) PCT Filed: Jul. 13, 2018

(86) PCT No.: PCT/CN2018/095611
§ 371 (c)(1),
(2) Date: Mar. 5, 2019

(87) PCT Pub. No.: WO2019/062284
PCT Pub. Date: Apr. 4, 2019

(65) Prior Publication Data
US 2021/0356639 A1 Nov. 18, 2021

(30) Foreign Application Priority Data
Sep. 27, 2017 (CN) .......................... 201721254247.1

(51) Int. Cl.
*G02B 5/22* (2006.01)
(52) U.S. Cl.
CPC .......... *G02B 5/22* (2013.01); *G02B 2207/113* (2013.01)
(58) Field of Classification Search
CPC ........ G02B 5/201; G02B 5/206; G02B 5/207; G02B 5/22; G02B 5/223; G02B 2207/113

USPC .......................................................... 359/891
See application file for complete search history.

(56) References Cited

U.S. PATENT DOCUMENTS

| | | | | |
|---|---|---|---|---|
| 2011/0281388 A1* | 11/2011 | Gough | ................... | B82Y 20/00 546/14 |
| 2014/0313112 A1* | 10/2014 | Madhusudan | ....... | G09G 3/3208 345/83 |
| 2015/0048348 A1* | 2/2015 | Huang | ................ | H01L 51/5284 257/40 |

(Continued)

FOREIGN PATENT DOCUMENTS

| CN | 103926745 A | 7/2014 |
|---|---|---|
| CN | 104460103 A | 3/2015 |
| CN | 105242448 A | 1/2016 |

(Continued)

OTHER PUBLICATIONS

International Search Report and Written Opinion dated Oct. 10, 2018; PCT/CN2018/095611.

*Primary Examiner* — Jade R Chwasz

(57) ABSTRACT

A color filtering film, a color filter substrate and a display device are disclosed. The color filtering film includes: a color filtering layer and a quantum dot layer laminated on the color filtering layer. The color filtering layer includes a plurality of groups of color filtering units, each group of color filtering units includes a first color filtering unit and a fourth color filtering unit, any first color filtering unit being spaced apart from the third color filtering unit.

19 Claims, 4 Drawing Sheets

(56) References Cited

U.S. PATENT DOCUMENTS

2018/0031909 A1 2/2018 Liu
2018/0067363 A1* 3/2018 Li .................... G02F 1/133621

FOREIGN PATENT DOCUMENTS

CN 105319765 A 2/2016
CN 105954914 A 9/2016

* cited by examiner

COLOR FILTERING FILM, COLOR FILTER SUBSTRATE AND DISPLAY DEVICE

CROSS REFERENCE TO RELATED APPLICATIONS

The application claims priority to Chinese patent application No. 201721254247.1 filed on Sep. 27, 2017, the entire disclosure of which is incorporated herein by reference as part of the present application.

TECHNICAL FIELD

Embodiments of the present disclosure relates to a color filtering film, a color filter substrate, and a display device.

BACKGROUND

Quantum dots are widely applied in the fields such as the field of light-emitting diodes, the field of solar cells and the field of biofluoreseent labeling. In the display field, QLED Displays (Quantum Dot Light Emitting Diode Displays) technology which adopts quantum dot thin film layers as the light-emitting layers is a new generation of display technology after LCD (Liquid Crystal Display) and OLED (Organic Light Emitting Diode) technologies. Based on this, quantum dot display technology has broad application prospects in national defense, aerospace, intelligence and energy. Therefore, the application of the quantum dot in the display field may be advantageous for obtaining display devices with high performance, and therefore become a development trend in the display field.

SUMMARY

In an aspect of the present disclosure, a color filtering film is provided, and the color filtering film comprises: a color filtering layer, the color filtering layer comprising a plurality of groups of color filtering units, each group of color filtering units comprising a first color filtering unit, and a third color filtering unit, any first color filtering unit being spaced apart from the third color filtering unit; and a quantum dot layer, laminated on the color filtering layer.

In at least some embodiments, the color filtering layer further comprises a second color filtering unit and a fourth filtering unit, the first color filtering unit and the third color filtering unit being spaced apart from each other by at least one of the second color filtering unit and the fourth color filtering unit.

In at least some embodiments, the color filtering layer further comprising a second color filtering unit and a fourth filtering unit, the first color filtering unit is a red color filtering unit, and a third color filtering unit is a green color filtering unit.

In at least some embodiments, only the second color filtering unit is disposed between the red color filtering unit and the green color filtering unit, and the fourth color filtering unit and the second color filtering unit are disposed at opposite sides of the green color filtering unit.

In at least some embodiments, the second color filtering unit is a blue color filtering unit, and the fourth color filtering unit is a white color filtering unit or a yellow color filtering unit.

In at least some embodiments, the quantum dot layer comprises a first quantum dot unit and a second quantum dot unit, the first quantum dot unit and the first color filtering unit are disposed to be in one-to-one correspondence, and the second quantum dot unit and the third color filtering unit are disposed to be in one-to-one correspondence.

In at least some embodiments, a width of an orthographic projection of the first quantum dot unit on the color filtering layer is equal to or greater than a width of the first color filtering unit.

In at least some embodiments, the orthographic projection of the first quantum dot unit on the color filtering layer overlaps at least one of the color filtering units next to the first color filtering unit in a direction perpendicular to the color filtering layer.

In at least some embodiments, the at least one of the color filtering units next to the first color filtering unit comprises a non-overlapping portion, and the non-overlapping portion is non-overlapped with the orthographic projection of the first quantum dot unit on the color filtering layer in the direction perpendicular to the color filtering layer.

In at least some embodiments, a width of an orthographic projection of the second quantum dot unit on the color filtering layer is equal to or greater than a width of the third color filtering unit.

In at least some embodiments, the orthographic projection of the second quantum dot unit on the color filtering layer overlaps at least one of the color filtering units next to the third color filtering unit in a direction perpendicular to the color filtering layer.

In at least some embodiments, the at least one of the color filtering units next to the third color filtering unit comprises an non-overlapping portion, and the non-overlapping portion is non-overlapped with the orthographic projection of the second quantum dot unit on the color filtering layer in the direction perpendicular to the color filtering layer.

In at least some embodiments, the quantum dot layer comprises a quantum dot material to be excited by blue light.

In at least some embodiments, the first quantum dot unit is a red quantum dot unit, and the second quantum dot unit is a green quantum dot unit.

In at least some embodiments, the first color filtering unit is a red color filtering unit, the second color filtering unit is a blue color filtering unit, the third color filtering unit is a green color filtering unit, and the fourth color filtering unit comprises at least one of a white color filtering unit and a yellow color filtering unit.

In another aspect of the present disclosure, a color filter substrate is provided, and the color filter substrate comprises the color filtering film as mentioned above.

In at least some embodiments, the quantum dot layer of the color filtering film is disposed to be closer to a light incident direction of the color filter substrate; the color filtering layer is disposed to be closer to a light exiting direction of the color filter substrate.

In further another aspect of the present disclosure, a display device is provided, and the display device comprises the color filter substrate as mentioned above.

In at least some embodiments, the display device further comprises: a blue backlight source, wherein the blue backlight source is at a side of the quantum dot layer away from the color filtering film.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
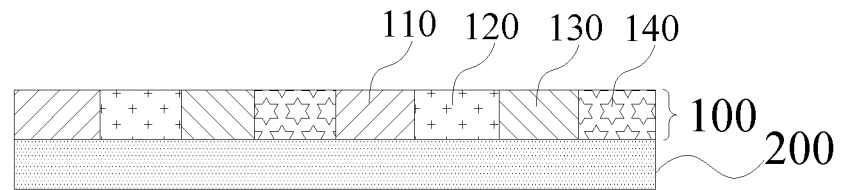
FIG. 1 illustrates a schematically structural view of a color filtering film according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

At present, in order to avoid technical problems such as cross-color phenomenon and reductions of color gamut and brightness, the requirement on alignment accuracy of color filtering films with quantum dots is very high. For example, a red quantum dot unit needs to correspond to a red color filtering unit. In the case where deviations are occurred in a printing process and an overlapping is present between the red quantum dot unit and a green quantum dot unit, cross-color is easily occurred at the overlapping position, which causes a significant reduction in light-emitting efficiency and reductions in color gamut and brightness of product.

The embodiments of the present disclosure provide a color filtering film. The color filtering film comprises: a color filtering layer 100 and a quantum dot layer 200 laminated on the color filtering layer 100. The color filtering layer 100 comprises a plurality of groups of color filtering units; each of groups of color filtering units comprises a first color filtering unit 110, a second color filtering unit 120, a third color filtering unit 130 and a fourth color filtering unit 140: the first color filtering unit 110 are spaced apart from the third color filtering unit 130 by at least one of the second color filtering unit 120 and the fourth color filtering unit 140. According to the embodiments of the present disclosure, the quantum dot layer 200 and the color filtering layer 100 are in direct contact with each other, and no gap is between the quantum dot layer 200 and the color filtering layer 100.

According to the embodiments of the present disclosure, the plurality of groups of color filtering units are arranged in the color filtering layer in a repeated manner, and in any two adjacent groups, the arrangement orders of the color filtering units of different colors are the same.

According to the embodiments of the present disclosure, as illustrated in FIG. 1, the first color filtering unit 110 is a red color filtering unit, the third color filtering unit 130 is a green color filtering unit; any of red color filtering units in the color filtering layer is not in contact with the green color filtering unit, that is, the color filtering unit which is in contact with the red color filtering unit is not green color filtering unit.

According to the embodiments of the present disclosure, only the second color filtering unit 120 is disposed between the red color filtering unit and the green color filtering unit, and the fourth color filtering unit 140 and the second color filtering unit 120 are disposed at opposite sides of the green color filtering unit.

According to the embodiments of the present disclosure, the second color filtering unit 120 is a blue color filtering unit, and the fourth color filtering unit 140 is a white color filtering unit or a yellow color filtering unit.

By this way, the color filtering film has at least one of the following advantages: the requirement on the alignment accuracy of the quantum dot layer 200 is low, cross-color phenomenon can be avoided, light-emitting efficiency can be increased, display color gamut can be increased, and display brightness can be increased.

Figure 5:
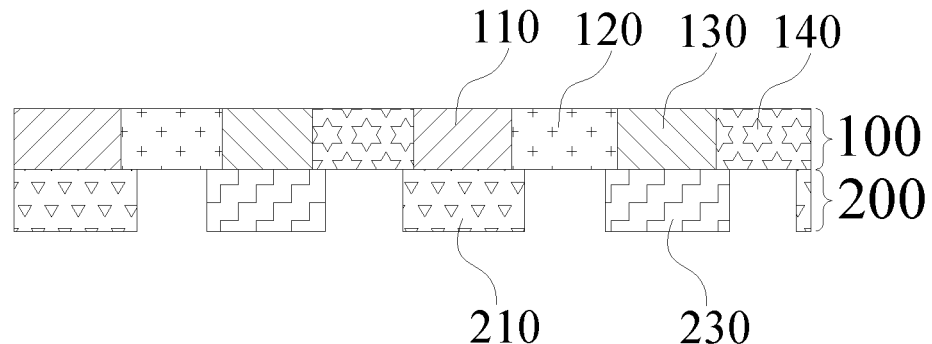
FIG. 5 illustrates a schematically structural view of a color filtering film according to an embodiment of the present disclosure.

According to the embodiments of the present disclosure, as illustrated in FIG. 5, the quantum dot layer 200 comprises a first quantum dot unit 210 and a second quantum dot unit 230. According to the embodiments of the present disclosure, the first quantum dot unit 210 and the first color filtering unit 110 are disposed to be in one-to-one correspondence. According to the embodiments of the present disclosure, the second quantum dot unit 230 and the third color filtering unit 130 are disposed to be in one-to-one correspondence. By this way, the quantum dot units may be correspondingly arranged with respect to the color filtering units. Because the quantum dots generate light with corresponding colors, the energy loss can be reduced and the display performance of the color filtering film can be further increased.

Figure 2:
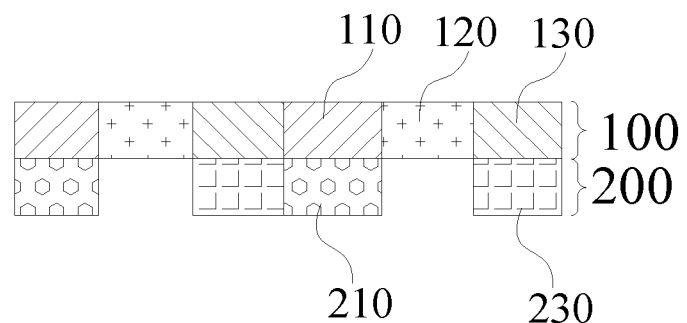
FIG. 2 illustrates a schematically structural view of a color filtering film.
Figure 3:
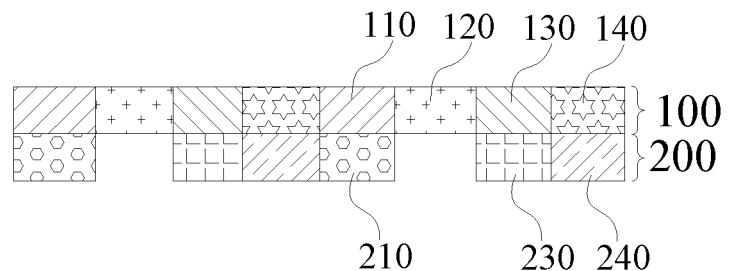
FIG. 3 illustrates a schematically structural view of another color filtering film.
Figure 4:
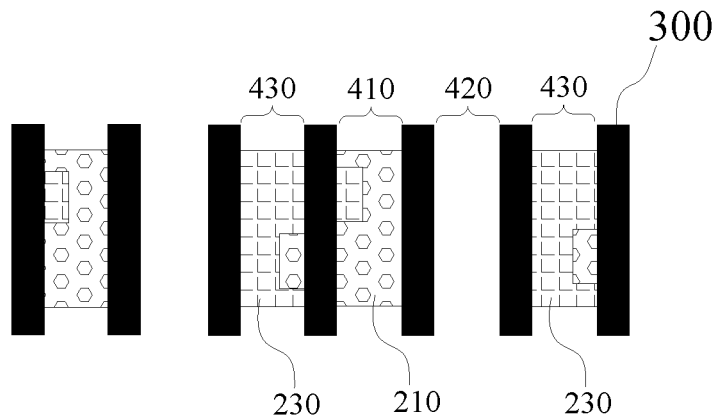
FIG. 4 illustrates a top view of part of a color filtering film.

In a related color filtering film, the color filtering layer 100 may adopt a three-color structure of red, blue and green, as illustrated in FIG. 2; or, the color filtering layer 100 may adopt a four-color structure of red, blue, green, and yellow, as illustrated in FIG. 3. In the case where the blue backlight is incident onto the quantum dot layer 200, the red quantum dot unit 210 emits red light, the green quantum dot unit 230 emits green light, the yellow quantum dot unit 240 emits yellow light, after the red, green and yellow lights pass through their corresponding color filtering layers, the colorful display can be realized. For example, the red quantum dot unit 210 is next to the green quantum dot unit 230, the alignment accuracy of the quantum dot layer is deviated, and part of the green quantum dot is mixed in the red quantum dot unit, in this case, part of green light is mixed into the backlight which is incident on the red color filtering unit. By taking the three-color structure of red, blue and green illustrated in FIG. 2 as an example, the color filtering film of FIG. 2 has a quantum dot layer illustrated in FIG. 4. In the case where the accuracy of the fabrication processes is relatively low, the deviation may occur in the region between a plurality of black matrix, and the green quantum dot (which should be in a green color filtering unit region 430) may enter into a red color filtering unit region 410 and the red quantum dot may enter into a part of the green color filtering unit region 430, as a result, the cross-color phenomenon between the red quantum dot unit and the green quantum dot unit is caused at the overlapping position between the red color filtering unit region and the green color filtering unit region.

For the sake of avoiding the above-mentioned cross-color phenomenon, the color filtering units and the quantum dot units of different colors may be provided, in this way, there is no need to develop new and accurate fabrication processes as well as modify current printing processes. By taking blue backlight as an example, relative severe cross-color phenomenon is present between the red and green color filtering units, but the cross-color phenomenon is not present between the red and blue color filtering units, between the red and yellow color filtering units, and even between the red and white color filtering units. Therefore, the above-mentioned cross-color phenomenon can be avoided simply through allowing the red color filtering unit and the green color filtering unit to be spaced apart from each other by the color filtering unit with other color.

Figure 6:
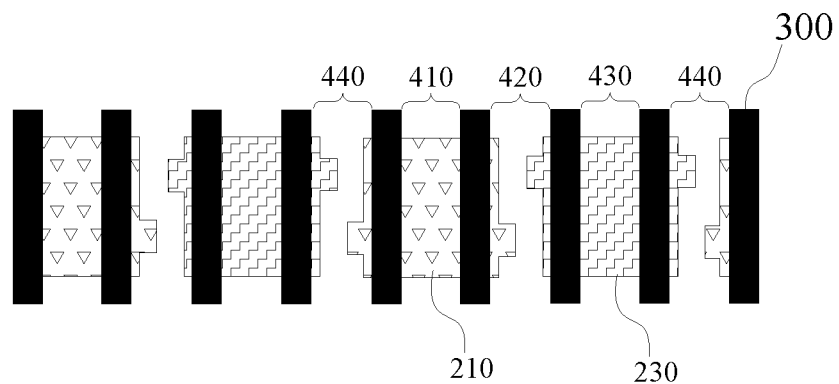
FIG. 6 illustrates a top view of part of a color filtering film according to an embodiment of the present disclosure.

According to the embodiments of the present disclosure, by taking the blue backlight as an example, the first color filtering unit 110 may be a red color filtering unit, the third color filtering unit 130 may be a green color filtering unit, and the first color filtering unit 110 and the third color filtering unit 130 may be spaced apart from each other by at least one of the second color filtering unit 120 (may be a blue color filtering unit) and the fourth color filtering unit 140 (may be a white color filtering unit or a yellow color filtering unit). In this case, the color filtering film can be fabricated through printing the quantum dot layer only including the red quantum dot and the green quantum dot, and the colorful display can be realized: blue light may be provided by the backlight, yellow light may be provided by mixing the red light with the green light, white light may be provided by the backlight (blue color), the red quantum dot and the green quantum dot. For example, the first quantum dot unit 210 is a red quantum dot unit, and the second quantum dot unit 230 is a green quantum dot unit. In the structure as illustrated in FIG. 5 and FIG. 6, in the case where the accuracy of the fabrication processes is relatively low, the red quantum dot in the red quantum dot unit 210 may enter into both a part of the blue color filtering unit region 420 and a part of the yellow color filtering unit region 440; the green quantum dot in the green quantum dot unit 230 may enter into a part of the blue color filtering unit region 420 as well as a part of the yellow color filtering unit region 440. Even though the above-mentioned deviations are present, the cross-color between the red quantum dot unit and the green quantum dot unit cannot present because the red quantum dot unit 210 and the green quantum dot unit 230 are spaced apart from each other and are not in contact with each other. Because deviations only present in the blue color filtering unit region 420 and the yellow color filtering unit region 440, the red light and the green light generated in deviation regions may be mixed with the blue light to generate a white light in the deviation regions having no quantum dot unit disposed therein, and the white light can be used to realize normal display, which does not affect the color gamut and the brightness of light of other colors. In summary, the color filtering film lowers the requirement on the alignment accuracy of the quantum dot layer, avoids the cross-color phenomenon, increases light-emitting efficiency, increases display color gamut and brightness, and further reduces difficulty in film-forming of the quantum dot layer and alleviates the problem of low resolution.

According to the embodiments of the present disclosure, as illustrated in FIG. 5, the orthographic projection of the first quantum dot unit 210 on the color filtering layer 100 at least overlaps the first color filtering unit 110; the orthographic projection of the second quantum dot unit 230 on the color filtering layer 100 at least overlaps the third color filtering unit 130. Therefore, the quantum dot units may be arranged in correspondence with the color filtering units, and the quantum dots generate light of corresponding colors, such that energy loss can be reduced, and the display performance of the color filtering film can be further increased.

As illustrated in FIG. 5, the width of the orthographic projection of the first quantum dot unit 210 on the color filtering layer 100 is equal to or greater than the width of the first color filtering unit 110. The width of the orthographic projection of the second quantum dot unit 230 on the color filtering layer 100 is equal to or greater than the width of the third color filtering unit 130. For example, the width in the present disclosure is the width along the horizontal direction, for example, the width is measured along x direction.

According to the embodiments of the present disclosure, the orthographic projection of the first quantum dot unit 210 on the color filtering layer 100 overlaps at most a portion of the color filtering unit which is arranged to be next to the first color filtering unit 210; the orthographic projection of the second quantum dot unit 230 on the color filtering layer 100 overlaps at most a portion of the color filtering unit which is arranged to be next to the third color filtering unit 130. Therefore, the cross-color phenomenon can be avoided, the light emitting efficiency can be increased, the display color gamut can be increased, and the display brightness can be increased.

As illustrated in FIG. 5, the orthographic projection of the first quantum dot unit 210 on the color filtering layer 100 overlaps at least one of the color filtering units next to the first color filtering unit 110 in the direction perpendicular to the color filtering layer 100. For example, at least one of the color filtering units next to the first color filtering unit 110 comprises the fourth color filtering unit 140 at the left of the first color filtering unit 110 and the second color filtering unit 120 at the right of the first color filtering unit 110. Furthermore, both the second color filtering unit 120 and the fourth color filtering unit 140 which are next to the first color filtering unit 110 comprise an non-overlapping portion, and the non-overlapping portion do not overlap the orthographic projection of the first quantum dot unit 210 on the color filtering layer 100 in the direction perpendicular to the color filtering layer 100.

According to the embodiments of the present disclosure, at least a portion of the color filtering unit which is next to any of the first color filtering unit 110 or the third color filtering unit 130 does not overlap any of the orthographic projections of the first quantum dot unit 210 and the second quantum dot unit 230 on the color filtering layer 100. Therefore, the display performance of the color filtering film can be further increased.

As illustrated in FIG. 5, the orthographic projection of the second quantum dot unit 230 on the color filtering layer 100 overlaps at least one of the color filtering units next to the third color filtering unit 130 in the direction perpendicular to the color filtering layer 100. For example, at least one of the color filtering units next to the third color filtering unit 130 comprises the second color filtering unit 120 at the left of the third color filtering unit 130 and the fourth color filtering unit 140 at the right of the third color filtering unit 130. Furthermore, both the second color filtering unit 120 and the fourth color filtering unit 140 which are next to the third color filtering unit 130 comprise an non-overlapping portion, and the non-overlapping portion does not overlap the orthographic projection of the second quantum dot unit 230 on the color filtering layer 100 in the direction perpendicular to the color filtering layer 100.

No specific limitations will be given to the colors of the above-mentioned color filtering units, and those skilled in the art may choose the colors of the above-mentioned color filtering units according to the color of the backlight, so as to avoid the cross-color occurring between neighboring color filtering units. For example, in the case where the backlight is the blue light, according to the embodiments of the present disclosure, the first color filtering unit 110 may be a red color filtering unit. According to the embodiments of the present disclosure, the second color filtering unit 120 may be a blue color filtering unit. According to the embodiments of the present disclosure, the third color filtering unit 130 may be a green color filtering unit. According to the embodiments of the present disclosure, the fourth color filtering unit 140 comprises at least one of the white color filtering unit and the yellow color filtering unit. By providing the fourth color filtering unit 140, the cross-color phenomenon can be effectively avoided. The white color filtering unit can increase the display brightness, and the yellow color filtering unit can increase the display color gamut. According to the embodiments of the present disclosure, the first quantum dot unit 210 may be a red quantum dot unit. According to the embodiments of the present disclosure, the second quantum dot unit 230 is a green quantum dot unit. The quantum dots can generate light with corresponding colors after being excited, and therefore, the display performance of the color filtering film can be further increased.

According to the embodiments of the present disclosure, the quantum dot layer comprises a quantum dot material which is able to be excited by the blue light. According to the embodiments of the present disclosure, no specific limitations will be given to the type of the quantum dot material, and those skilled in the art may select specific type of the quantum dot material according to actual needs. Therefore, the display performance of the color filtering film is further increased.

Figure 7:
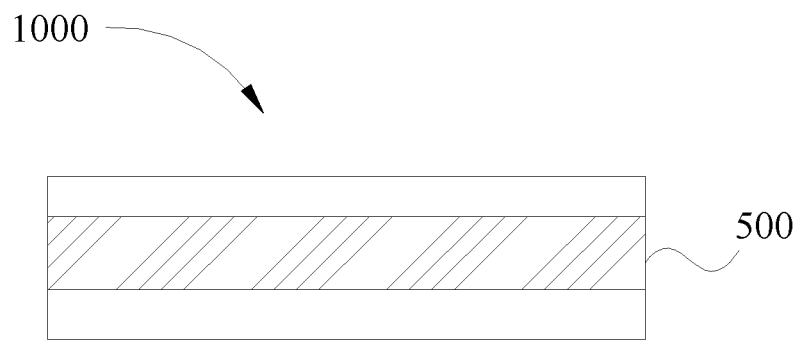
FIG. 7 illustrates a schematically structural view of a color filter substrate according to an embodiment of the present disclosure.

The embodiments of the present disclosure further provide a color filter substrate. As illustrated in FIG. 7, the color filter substrate 1000 comprises the color filtering film 500 as described above. Therefore, the color filter substrate 1000 has all of features and advantages of the color filtering film 500 as described above and no further description will be given here. In general, the color filter substrate 1000 has at least one of the following advantages: lower requirement on the alignment accuracy of the quantum dot layer; avoiding the cross-color phenomenon; increasing the light emitting efficiency; increasing the display color gamut; increasing the display brightness.

Figure 8:
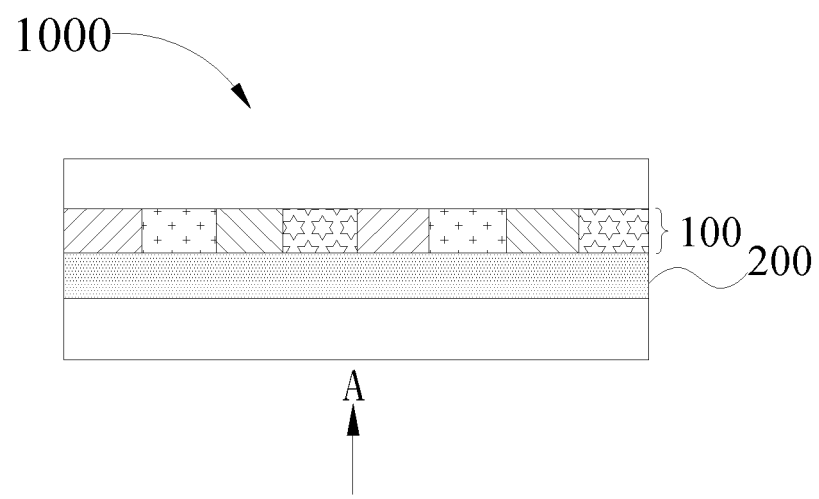
FIG. 8 illustrates a schematically structural view of a color filtering film according to another embodiment of the present disclosure.

According to the embodiments of the present disclosure, as illustrated in FIG. 8, the quantum dot layer 200 of the color filtering film is arranged to face toward the light incident direction (the direction A as illustrated in FIG. 8) of the color filter substrate 1000, and the color filtering layer 100 is arranged to face toward the light exiting direction of the color filter substrate 1000. Therefore, the display performance of the color filter substrate 1000 is further increased.

Figure 9:
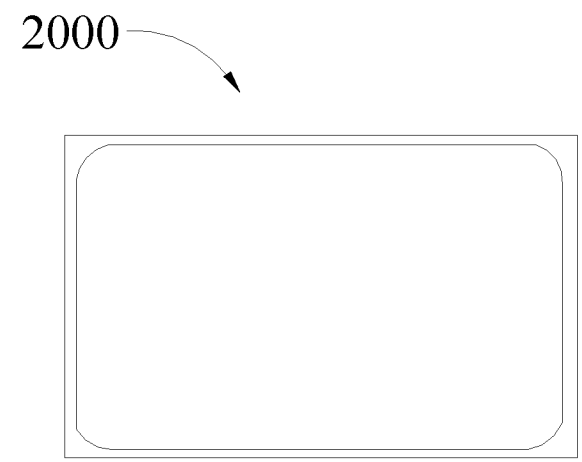
FIG. 9 illustrates a schematically structural view of a display device according to an embodiment of the present disclosure.

The embodiments of the present disclosure further provide a display device. As illustrated in FIG. 9, the display device 2000 comprises the color filter substrate 1000 as mentioned above. Therefore, the display device 2000 has all of features and advantages of the color filter substrate 1000, and no further description will be given here. In general, the display device 2000 has at least one of the following advantages: lower requirement on the alignment accuracy of the quantum dot layer; avoiding the cross-color phenomenon; increasing the light emitting efficiency; increasing the display color gamut; increasing the display brightness.

Figure 10:
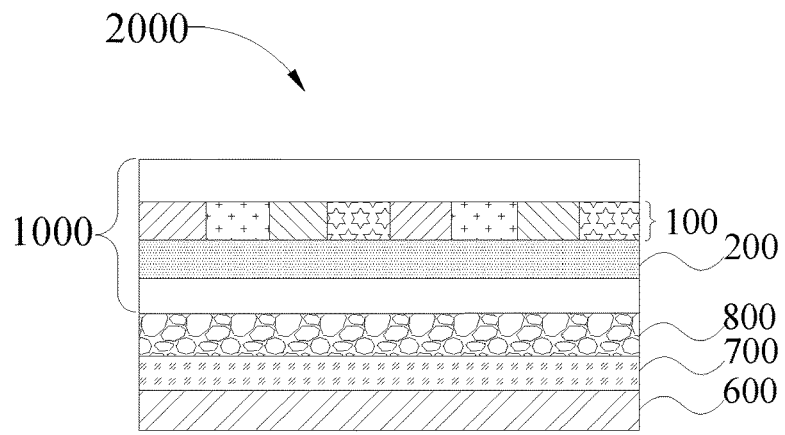
FIG. 10 illustrates a schematically structural view of a display device according to another embodiment of the present disclosure.

According to the embodiments of the present disclosure, as illustrated in FIG. 10, the display device 2000 further comprises: a blue backlight source 600, in which the blue backlight source 600 is at the side of the quantum dot layer 200 away from the color filtering film 100. According to the embodiments of the present disclosure, the blue backlight source 600 allows the quantum dot layer 200 to generate light with corresponding colors. Therefore, the display performance of the display device can be further increased. It should be noted that, the display device 2000 may further comprise other structures, such as an array substrate 700 and a liquid crystal molecular layer 800, so as to realize display function.

Performance test results of the color filtering film according to the embodiments of the present disclosure and the color filtering film as illustrated in FIG. 3 are respectively given in the following.

Comparative Example

Figure 11A:
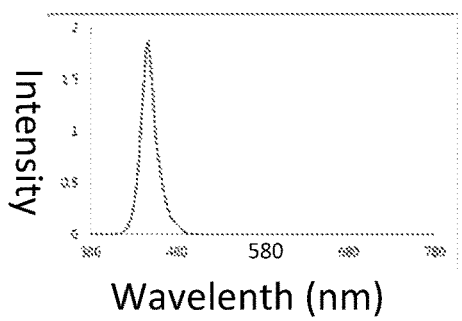
FIG. 11a illustrates a spectrum diagram of a blue backlight of a color filtering film.
Figure 11B:
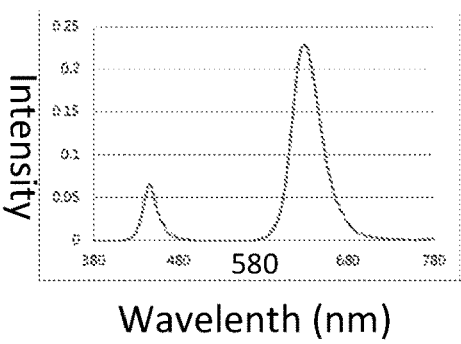
FIG. 11b illustrates a spectrum diagram of a backlight of a color filtering film after passing through a red quantum dot unit.
Figure 11C:
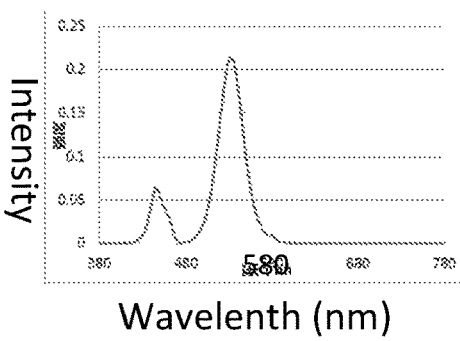
FIG. 11c illustrates a spectrum diagram of a backlight of a color filtering film after passing through a green quantum dot unit.

The color filtering film with four-color (red, blue, green, and yellow) structure as illustrated in FIG. 3 is taken as a sample of the comparative example. In the sample, the light emitted by the backlight is blue light, and the spectrum of the blue backlight is illustrated in FIG. 11a. The spectrum of the blue backlight after passing through the red quantum dot unit is illustrated in FIG. 11b, and the blue backlight is converted into red light. The spectrum of the blue backlight after passing through the green quantum dot unit is illustrated in FIG. 11c, and the blue backlight is converted into green light. The color gamut of the sample is approximately 96% under normal display, in which the color coordinate of red color is (0.68, 0.32) [CIE1931], the color coordinate of green color is (0.21, 0.71) [CIE1931], the brightness of L255 is 220 nits. In the case where deviation of the manufacturing process is present, the color coordinate of red color is (0.665, 0.335) [CIE1931], the color coordinate of green color is (0.245, 0.705) [CIE1931], the color gamut is decreased to 85%, and the brightness of L255 is 200 nits.

According to the embodiments of the present disclosure, the color filtering film is manufactured to have the structure illustrated in FIG. 5. The color gamut of the color filtering film is approximately 96% under normal display, in which the color coordinate of red color is (0.68, 0.32) [CIE1931], the color coordinate of green color is (0.21, 0.71) [CIE1931], the brightness of L255 is 220 nits. In the case where deviation of the manufacturing process is present, the color and brightness is the same as the color and brightness under normal display. Therefore, it can be concluded that the color filtering film manufactured according to the embodiments of the present disclosure has a lower requirement on the alignment accuracy of the quantum dot layer, and the cross-color phenomenon can be avoided even if there is any deviation present in the manufacturing process.

In the present disclosure, the following statements should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness of a layer or area may be enlarged or narrowed, that is, the drawings are not drawn in a real scale.

(3) In case of no conflict, features in one embodiment or in different embodiments can be combined to obtain new embodiments.

What is described above is related to the illustrative embodiments of the disclosure only and not limitative to the scope of the disclosure; the scopes of the disclosure are defined by the accompanying claims.

What is claimed is:

1. A color filtering film, comprising:
a color filtering layer, the color filtering layer comprising a plurality of groups of color filtering units, each group of color filtering units comprising a first color filtering unit and a third color filtering unit, any first color filtering unit being spaced apart from the third color filtering unit; and
a quantum dot layer, laminated on the color filtering layer, wherein the color filtering layer further comprising a second color filtering unit and a fourth filtering unit, the first color filtering unit and the third color filtering unit being spaced apart from each other by at least one of the second color filtering unit and the fourth color filtering unit, the first color filtering unit is a red color filtering unit, a third color filtering unit is a green color filtering unit,
wherein the quantum dot layer comprises a first quantum dot unit and a second quantum dot unit which are spaced apart from each other,
wherein at least part of the second color filtering unit is located between the first quantum dot unit and the second quantum dot unit in a direction parallel to a plane where the color filtering layer is located.

2. The color filtering film according to claim 1, wherein only the second color filtering unit is disposed between the red color filtering unit and the green color filtering unit; the fourth color filtering unit and the second color filtering unit are disposed at opposite sides of the green color filtering unit.

3. The color filtering film according to claim 2, wherein the second color filtering unit is a blue color filtering unit, and the fourth color filtering unit is a white color filtering unit or a yellow color filtering unit.

4. The color filtering film according to claim 1, wherein the first quantum dot unit and the first color filtering unit are disposed to be in one-to-one correspondence, and the second quantum dot unit and the third color filtering unit are disposed to be in one-to-one correspondence.

5. The color filtering film according to claim 4, wherein a width of an orthographic projection of the first quantum dot unit on the color filtering layer is equal to or greater than a width of the first color filtering unit.

6. The color filtering film according to claim 5, wherein the orthographic projection of the first quantum dot unit on the color filtering layer overlaps at least one of the color filtering units next to the first color filtering unit in a direction perpendicular to the color filtering layer.

7. The color filtering film according to claim 4, wherein a width of an orthographic projection of the second quantum dot unit on the color filtering layer is equal to or greater than a width of the third color filtering unit.

8. The color filtering film according to claim 4, wherein the at least one of the color filtering units next to the first color filtering unit comprises a non-overlapping portion, and the non-overlapping portion is non-overlapped with the orthographic projection of the first quantum dot unit on the color filtering layer in the direction perpendicular to the color filtering layer.

9. The color filtering film according to claim 7, wherein the orthographic projection of the second quantum dot unit on the color filtering layer overlaps at least one of the color filtering units next to the third color filtering unit in a direction perpendicular to the color filtering layer.

10. The color filtering film according to claim 9, wherein the at least one of the color filtering units next to the third color filtering unit comprises a non-overlapping portion, and the non-overlapping portion is non-overlapped with the orthographic projection of the second quantum dot unit on the color filtering layer in the direction perpendicular to the color filtering layer.

11. The color filtering film according to claim 4, wherein the first quantum dot unit is a red quantum dot unit and the second quantum dot unit is a green quantum dot unit.

12. The color filtering film according to claim 1, wherein the quantum dot layer comprises a quantum dot material to be excited by a blue light.

13. The color filtering film according to claim 1, wherein the second color filtering unit is a blue color filtering unit, and the fourth color filtering unit comprises at least one of a white color filtering unit and a yellow color filtering unit.

14. The color filtering film according to claim 1, wherein the quantum dot layer comprises a red quantum dot unit and a green quantum dot unit, an orthographic projection of the red quantum dot unit on the color filtering layer is non-overlapped with the green quantum dot unit on the color filtering layer in a direction perpendicular to the color filtering layer.

15. The color filtering film according to claim 1, wherein the first color filtering unit the at least one of the second color filtering unit and the fourth color filtering unit, and the third color filtering unit are arranged along a row direction.

16. A color filter substrate, comprising a color filtering film, the color filtering film comprising:

a color filtering layer, the color filtering layer comprising a plurality of groups of color filtering units, each group of color filtering units comprising a first color filtering unit and a third color filtering unit, any first color filtering unit being spaced apart from the third color filtering unit; and a quantum dot layer, laminated on the color filtering layer, wherein the color filtering layer further comprising a second color filtering unit and a fourth filtering unit, the first color filtering unit and the third color filtering unit being spaced apart from each other by at least one of the second color filtering unit and the fourth color filtering unit, the first color filtering unit is a red color filtering unit, a third color filtering unit is a green color filtering unit, wherein the quantum dot layer comprises a first quantum dot unit and a second quantum dot unit which are spaced apart from each other, wherein at least part of the second color filtering unit is located between the first quantum dot unit and the second Quantum dot unit in a direction parallel to a plane where the color filtering layer is located.

17. The color filter substrate according to claim 16, wherein the quantum dot layer of the color filtering film is disposed to be proximal to a light incident direction of the color filter substrate, and the color filtering layer is disposed to be proximal to a light exiting direction of the color filter substrate.

18. A display device, comprising a color filter substrate, the color filter substrate comprising a color filtering film, the color filtering film comprising:

a color filtering layer, the color filtering layer comprising a plurality of groups of color filtering units, each group of color filtering units comprising a first color filtering unit and a third color filtering unit, any first color filtering unit being spaced apart from the third color filtering unit; and a quantum dot layer, laminated on the color filtering layer, wherein the color filtering layer further comprising a second color filtering unit and a fourth filtering unit, the first color filtering unit and the third color filtering unit being spaced apart from each other by at least one of the second color filtering unit and the fourth color filtering unit, the first color filtering unit is a red color filtering unit, a third color filtering unit is a green color filtering unit, wherein, the quantum dot layer comprises a first quantum dot unit and a second quantum dot unit which are spaced apart from each other, wherein at least part of the second color filtering unit is located between the first quantum dot unit and the second quantum dot unit in a direction parallel to a plane where the color filtering layer is located.

19. The display device according to claim 18, further comprising: a blue backlight source, wherein the blue backlight source is at a side of the quantum dot layer away from the color filtering film.

* * * * *

UNITED STATES PATENT AND TRADEMARK OFFICE
CERTIFICATE OF CORRECTION

PATENT NO. : 11,467,326 B2  
APPLICATION NO. : 16/330580  
DATED : October 11, 2022  
INVENTOR(S) : Yuanhui Guo et al.

Page 1 of 1

It is certified that error appears in the above-identified patent and that said Letters Patent is hereby corrected as shown below:

In the Claims

At Column 10, Line 26, Claim 8:
There should be "6" instead of "4" after "8. The color filtering film according to claim"

Signed and Sealed this
Second Day of May, 2023

Katherine Kelly Vidal
*Director of the United States Patent and Trademark Office*